United States Patent
Herold

(10) Patent No.: US 8,066,116 B2
(45) Date of Patent: Nov. 29, 2011

(54) CONVEYOR BELT END CONNECTION

(75) Inventor: Wolfgang Herold, Offenbach (DE)

(73) Assignee: Mato Maschinen-Und Metallwarenfabrik Curt Matthaei GmbH & Co. KG, Offenbach (DE)

( * ) Notice: Subject to any disclaimer, the term of this patent is extended or adjusted under 35 U.S.C. 154(b) by 165 days.

(21) Appl. No.: 12/378,626

(22) Filed: Feb. 18, 2009

(65) Prior Publication Data
US 2009/0223783 A1    Sep. 10, 2009

(30) Foreign Application Priority Data
Feb. 18, 2008  (EP) ................................ 08002927

(51) Int. Cl.
*B65G 17/00*    (2006.01)

(52) U.S. Cl. ............ 198/844.2; 474/253; 474/257; 24/31 L; 24/33 L; 24/37

(58) Field of Classification Search ........... 198/844.1, 198/844.2, 846, 847; 474/253, 255, 257; 24/33 L, 31 L, 37
See application file for complete search history.

(56) References Cited

U.S. PATENT DOCUMENTS

| | | | | |
|---|---|---|---|---|
| 19,318 A | | 2/1858 | Underwood | |
| 67,197 A | * | 7/1867 | Jordan | 24/31 L |
| 390,233 A | * | 10/1888 | Jackson | 24/37 |
| 834,273 A | | 10/1906 | Denney | |
| 948,350 A | * | 2/1910 | Skidmore | 24/31 L |
| 1,599,954 A | * | 9/1926 | Coffee | 24/31 L |
| 1,827,327 A | * | 10/1931 | Noble | 24/37 |
| 1,991,545 A | * | 2/1935 | Croft | 24/37 |
| 2,909,271 A | * | 10/1959 | Taylor | 198/690.2 |
| 3,445,899 A | * | 5/1969 | Koga Masaru | 24/37 |
| 3,748,698 A | | 7/1973 | Lachmann | |
| 4,212,094 A | * | 7/1980 | Pray | 24/31 B |
| 4,426,926 A | * | 1/1984 | Soteropulos et al. | 100/88 |
| 4,540,389 A | * | 9/1985 | Ramsey | 474/257 |
| 4,558,492 A | | 12/1985 | Hite et al. | |
| 5,114,001 A | * | 5/1992 | Anderson | 198/844.2 |
| 5,236,079 A | * | 8/1993 | Herold | 198/844.2 |
| 6,131,728 A | * | 10/2000 | Rizhanovsky | 198/844.2 |
| 6,216,849 B1 | * | 4/2001 | Sytema | 198/731 |
| 6,627,024 B2 | * | 9/2003 | Lane | 156/157 |

FOREIGN PATENT DOCUMENTS

| | | |
|---|---|---|
| DE | 41 16 084 A1 | 11/1992 |
| EP | 0 518 144 A1 | 12/1992 |
| EP | 0 596 219 A1 | 5/1994 |
| EP | 0 957 290 A1 | 11/1999 |
| GB | 727511 | 4/1955 |

* cited by examiner

*Primary Examiner* — Gene Crawford
*Assistant Examiner* — William R Harp
(74) *Attorney, Agent, or Firm* — Price Heneveld LLP

(57) ABSTRACT

A conveyor belt has a mono-ply construction comprising a central fabric ply, top and bottom cover layers and a connection interconnecting the opposite ends of the belt. The top and bottom cover layers are removed from the opposite ends of the belt to define exposed fabric ply regions which are arranged in a mutually overlapping relationship. Two connection plates extend generally over the entire width of the conveyor belt on opposite sides thereof, and fasteners extend through the connection plates and the opposite ends of the conveyor belt to form a secure, yet flexible, connection.

25 Claims, 5 Drawing Sheets

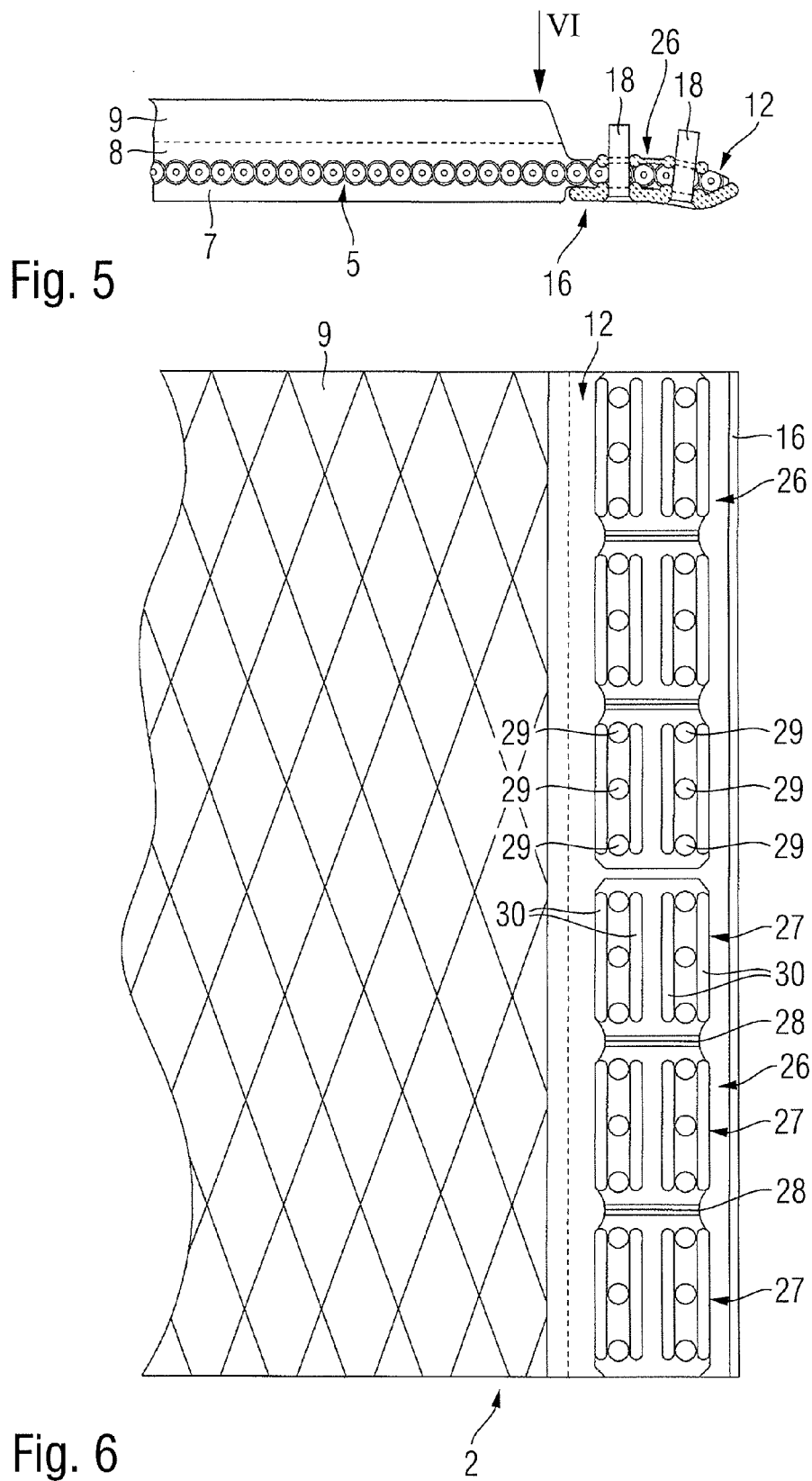

CONVEYOR BELT END CONNECTION

CLAIM OF PRIORITY

Applicant hereby claims the priority benefits under the provisions of 35 U.S.C. §119, basing said claim of priority on European Patent Application Serial No. 08 002 927.5, filed Feb. 18, 2008. In accordance with the provisions of 35 U.S.C. §119 and Rule 55(b), a certified copy of the above-listed European patent application will be filed before grant of a patent.

BACKGROUND OF THE INVENTION

The preset invention relates to a connection between two ends of a conveyor belt, and in particular to a connection, wherein the ends of the conveyor belt are connected by plates, which extend generally over the entire width of the conveyor belt, and are arranged on the top and bottom sides of the conveyor belt. Fasteners pass though the plates and the opposite ends of the conveyor belt, which has a mono-ply construction with a central fabric ply, a top cover layer and a bottom cover.

Belt connections are generally known from EP 0 957 290 A1, which is used in a conveyor belt for conveying heavy, irregularly shaped materials or objects, such as coal, ore, etc. On the side of the conveyor belt on which the material to be conveyed rests, the connection between the two ends of the conveyor belt is provided with a cover. This cover is intended to avoid increased wear of the plates caused by the conveyed materials.

In prior connections, the free front edges of the ends of the conveyor belt are arranged in an abutting relationship. Either the respective plate bears against the cover layer, or the cover layer is partly removed to accommodate the plate and the cover. The plates arranged in the regions of the two cover layers are fastened by means of fasteners, such as rivets, screws, staples, or the like, which are driven through the conveyor belt.

Furthermore, prior belt end connections are also known, wherein the free front edges of the belt ends are arranged in an abutting relationship, and the connection is effected by means of plates and fasteners arranged on both sides of the conveyor belt, as disclosed in EP 0 518 144 A1 and EP 0 596 219 A1. In the last-mentioned document, a tension element is provided for each belt end, and is arranged between the top and bottom sides of the conveyor belt, and extends transversely relative to the conveying direction of the belt. The task of this tension element is to stabilize the horizontal deformations of the belt material when pressure forces occur, so as to prevent curling or curved deformation of the front edge of the belt end.

A connection between two ends of a leather belt is also described in U.S. Pat. No. 834,273, wherein the ends of the leather belt are arranged in an overlapping manner and are pressed between plates essentially over the entire overlapping length, wherein fasteners connect the plates and pass through the leather belt. The overlapping ends of the leather belt are not reduced in their thickness, such that the connection has a large overall height and an abutting edge is obtained at the transition from one end of the leather belt to the other end of the leather belt.

What are referred to as "round balers" are used in agriculture. Their purpose is to press hay, straw or grass silage into bales. These bales can therefore be stored in a space-saving manner. Balers are as a rule pulled by a tractor and are driven via a power take-off shaft. For example, there is a known round baler produced by John Deere Vertrieb, a branch of Deere & Company, John-Deere-Straße 8, D-76646 Bruchsaal (model no. 572, 582, 592) with which dense round bales can be produced. In this round baler, the harvested material is conveyed directly into a variable pressing chamber. There, wide conveyor belts having a lozenge-shaped surface then take hold of the harvested material and form a dense and firm bale. The conveyor belts lie very close together and thus cover virtually the entire width of the bale. As a result, even very fine harvested material can be received and perfectly pressed without loss.

In current round balers, the respective conveyor belts are typically produced as endless belts with vulcanized and spliced ends. In order to fit such an endless belt or a multiplicity of endless belts arranged next to one another, it is necessary to keep clear lateral access to the pulley system of the round baler. This is typically not a problem during the initial assembly of the round baler, but is very disadvantageous from the point of view of the repair and/or replacement of the endless belts, because the round baler has to be disassembled or dismantled. Conveyor belts which have belt connectors connected to the belt ends arranged in an overlapping position are normally connected by means of a coupling rod, which is also used in round balers. With such a connection, however, the connectors and the coupling rod are subject to increased wear, in particular on account of the stones, dirt particles, etc., which are picked up with the harvested material. Consequently, the service life of such a connection is relatively short.

An endless connection for pressing belts in round balers for hay, straw or similar material accumulating in agricultural operations is also known from DE 41 16 084 A1.

SUMMARY OF THE INVENTION

One object of the present invention is to provide a connection of simple design between two ends of a conveyor belt. The connection is wear-resistant, and also has reduced noise characteristics during the deflection of the conveyor belt in the region of a pulley. Furthermore, a special use of such a connection is to be specified.

This object is achieved in a connection of the type mentioned above, in that the fabric ply is exposed in the regions of the ends of the conveyor belt by removing the cover layers, and the exposed ends of the conveyor belt are arranged in a mutually overlapping manner.

The configuration of the connection according to one aspect of the invention ensures that the two belt ends are connected only in that region of the conveyor belt in which the fabric ply is exposed. This results in a direct connection in the region of that component of the belt which effects the transmission of the tensile forces in the belt. In the regions of the two ends of the conveyor belt, the fabric plies lie in a double-ply configuration due to the overlapping arrangement, and the two plies contact one another. The two plies are pressed between the plates located on both sides of the ply assembly, and are connected to one another by fasteners.

A double joint is produced by this arrangement of the fabric ply, which is arranged in two plies and therefore in an overlapping manner, and by the connection of the rigid top and bottom plates, wherein a plurality of top plates and a plurality of bottom plates can be arranged next to one another, in a tightly packed manner, over the width of the belt. One of the two joints is formed between the full thickness conveyor belt region at one end of the conveyor belt and the adjacent end of the plate arrangement which faces the full thickness region, and the other of the two joints is formed between the opposite end of the plate arrangement and the full thickness region at the opposite end of the conveyor belt. This configuration ensures that the conveyor belt, irrespective of whether its bottom cover layer is moved around a deflection pulley, or whether its top cover layer is moved around a deflection pulley, is always deflected precisely in the region of the deflection pulley, without substantial shocks or impacts in the region of the abutting plate during the movement along the deflection pulley. This results in favorable noise characteristics of the connection in the region of the deflection pulley. Since the plates are disposed in an undercut area between the regions of the conveyor belt which are not reduced in thickness, the connection is optimized in terms of wear. Material conveyed by the conveyor belt therefore does not get caught in the region of the connection, and the connection is otherwise not subject to any increased wear by this material.

With respect to the longitudinal direction of the conveyor belt, the connection according to the present invention allows the connection length of the two ends of the conveyor belt to be kept very short. This is especially advantageous when the deflection pulleys have a relatively small diameter. Such small diameter deflection pulleys are used in particular in round balers of the type discussed above.

From this point of view, the connection according to the present invention is preferably used in a round baler, or other similar applications.

In one embodiment of the present belt end connection, the cover layers of the conveyor belt are preferably made of rubber. Rubber cover layers make possible an especially good entrainment capacity for harvested materials on account of the relatively high friction forces which can be transmitted between the rubber cover layer and the harvested material. In particular, provision can be made for one cover layer to have a greater thickness than the other cover layer. The cover layer having the greater thickness has profiling, in particular a lozenge-shaped profile or pattern, for example on the side facing away from the central fabric ply. The entrainment capacity is further improved by this profiling.

The connector plates can be interconnected in different ways on the opposite side of the fabric ply, for example by rivets, screws, staples, cramps or the like. A riveted connection is considered to be especially advantageous, since it is quite secure, and can be of a very flat construction with respect to the thickness of the conveyor belt. The connector plates can be made of metal, thereby providing for increased rigidity.

The connector plates are preferably of an essentially planar design. The connector plates may have a curved cross section directed toward the belt center at the leading and/or trailing portions thereof relative to the running direction of the conveyor belt. The plate region having the curved cross section preferably engages behind the free end of the central fabric ply, and thus constitutes a transition from the latter to the adjoining full thickness region of the conveyor, and covers the free front edge of the fabric ply. Due to this configuration, the belt end connection, and in particular the transition region from the exposed fabric ply to the unexposed region of the conveyor belt, is optimized in terms of wear, and an additional improvement is improved noise characteristics of the conveyor belt during the deflection of the conveyor belt over a deflection pulley.

The connection plates are preferably designed in such a way that they completely cover the exposed ends of the conveyor belt with respect to the longitudinal extent of the conveyor belt. As a result, protection of the exposed ends of the conveyor belt is optimized against the material conveyed by the conveyor belt. A plurality of connection plates are preferably arranged next to one another, in particular in a tightly packed manner, on each side of the conveyor belt. It is therefore not necessary for the deflection pulley to be strictly a cylindrical design.

It is considered to be especially advantageous if the thickness of the connection plate corresponds at most to the thickness of the cover layer adjacent to the connection plate. Consequently, the connection plate does not project beyond the cover layer, but rather is placed in a recess which is formed by the removed cover layer. This results in especially good wear and noise characteristics for the present connection.

It is considered to be especially advantageous if the exposed ends of the conveyor belt overlap substantially completely in such a way that the respective exposed one end of the conveyor belt is arranged adjacent to the respective facing cover layer in the region of the other end of the conveyor belt. This maximum overlap minimizes the gap between the full thickness regions of the conveyor belt, and provides an especially large area in the overlapping exposed fabric ply region, such that the forces can be introduced via the fastened plates into the overlapping fabric ply. Apart from these friction forces which can therefore be transmitted, further transmission of tensile forces is effected via the fasteners passing through the fabric ply.

For further improvement in the transmission of tensile forces in the region of the connection, at least one wire, rod or cable can be arranged in the width direction of the conveyor belt and inserted between the fabric ply arranged in an overlapping manner. This wire or the like is arranged in a positive locking manner between the transversely running fabric structures of the fabric ply arranged in two layers, whereby an improvement in the transmission of tensile forces in the region of the overlapping free ends of the fabric ply is ensured via this positive locking.

Furthermore, in order to improve the transmission of the tensile forces in the region of the connection, at least one intermediate plate, arranged in the width direction of the conveyor belt between the fabric ply arranged in an overlapping manner, can be inserted between the exposed ends of the conveyor belt. The respective intermediate plate is pressed between the exposed ends of the conveyor belt, and thus contributes considerably to an improvement in the transmission of tensile forces in the region of the overlapping free ends of the fabric ply. The intermediate plate is preferably provided with holes, through which pass a plurality of the fasteners for fastening the plates to the conveyor belt. Some of the fasteners, and in an extreme case, even all of the fasteners, which are connected to the plates, pass through the intermediate plate or intermediate plates, whereby a positive locking connection is produced in the direction of the tensile force introduced into the conveyor belt, thereby enabling maximum tensile forces to be transmitted by the conveyor belt in the region of the exposed ends of the conveyor belt. In this respect, the respective fasteners preferably pass closely through the holes of the intermediate plate, essentially free of play.

In particular, when using the connection in a round baler, the conveyor belt has a width of 150 to 300 mm and/or a thickness of 6 to 12 mm. The respective end of the conveyor belt is in particular exposed over a length of 10 to 30 mm, preferably 15 to 25 mm.

In addition, the exposed conveyor belt ends, arranged in an overlapping manner, can also be adhesively bonded to one another. This allows the connection according to the invention to be optimized.

Further features of the invention are shown in the following claims, the description of the drawings and in the drawings themselves.

BRIEF DESCRIPTION OF THE DRAWINGS

An exemplary embodiment of the invention is illustrated in the drawings without being restricted thereto. In the drawings:

FIG. 5 shows, in a sectional illustration according to FIG. 4, for one of the ends of the conveyor belt, its relevant connection to the other end of the conveyor belt; and FIG. 6 shows the arrangement according to FIG. 4 as viewed in the direction of arrow VI in FIG. 5.

DETAILED DESCRIPTION OF THE PREFERRED EMBODIMENTS

Figure 1:
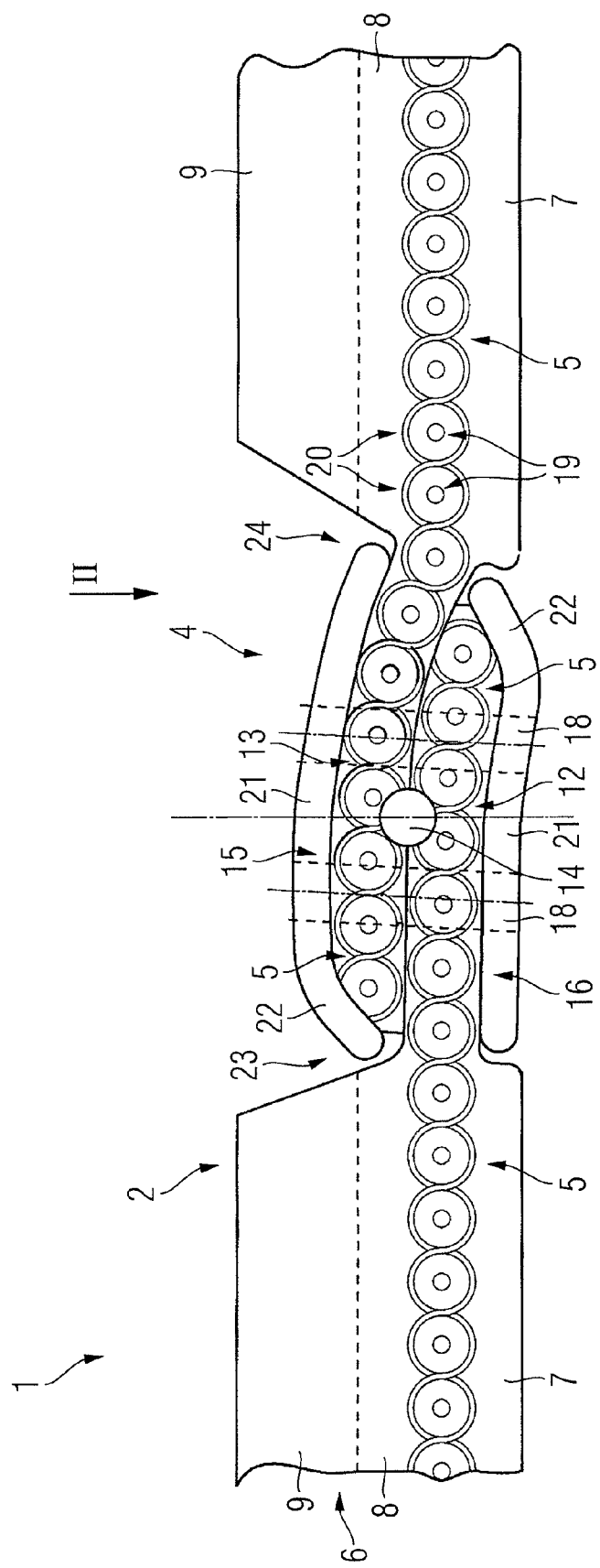
FIG. 1 shows a connection according to the invention between two ends of a conveyor belt, sectioned perpendicularly to the conveying plane of the conveyor belt, illustrated for a first exemplary embodiment.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The description below of the figures relates first of all to the first exemplary embodiment according to FIGS. 1 to 3.

The conveyor belt 1 has two ends 2 and 3 which are connected to one another by a connection 4. As can be seen from the illustration in FIG. 2, this connection 4 extends generally over the entire width of the conveyor belt 1.

The illustrated conveyor belt 1 has a mono-ply construction, including a central fabric ply of plastic, which is designated by the reference numeral 5. Fabric ply 5 is covered with a top cover layer 6 and a bottom cover layer 7, "top" and "bottom" referring to the orientation shown in FIG. 1. The fabric ply 5 and the two cover layers 6 and 7 are therefore fixedly connected to one another. The two cover layers 6 and 7 are preferably made of rubber. The bottom cover layer 7 is a solid rubber, as is the cover layer region 8, adjoining the fabric layer 5, of the top cover layer 6. Adjoining the cover layer region 8, on the side facing away from the fabric layer 5, is a pattern or profiled configuration, in particular lozenge-shaped, cover layer region 9 of the top cover layer 6. This diamond or lozenge-shaped cover layer region 9 can be seen in particular from FIG. 2. The transition between the cover layer regions 8 and 9 is illustrated by the broken line 10.

In the illustrated example, the thickness of the top cover layer 6 is greater than that of the bottom cover layer 7. In the exemplary embodiment, the conveyor belt 1, as can be seen from the illustration in FIG. 3, bears in the region of the bottom cover layer 7 against a deflection pulley 11, which may be a component of a round baler, or the like. This deflection pulley 11 is illustrated only via a sector of a circle. A multiplicity of deflection pulleys 11 are mounted in a round baler, and the conveyor belt 1 can also be positively deflected in the region of the top cover layer 6 by means of another deflection pulley. In one example of the present invention, the second deflection pulley has in particular a diameter which corresponds to the illustrated diameter of the deflecting pulley 11.

In the regions of the connection 4 between the two ends 2, 3 of the conveyor belt 1, the fabric ply 5 is exposed by removing the cover layers 6 and 7, and the exposed ends of the conveyor belt. Thus, the exposed fabric ply sections 5 are arranged in a mutually overlapping manner, as shown in FIGS. 1 and 3. In this case, the exposed ends 2 and 3 of the conveyor belt 1 overlap completely in such a way that the exposed section 12 of the conveyor belt end 2 is positioned adjacent to the facing bottom cover layer 7 in the region of the other end 3 of the conveyor belt 1, and the exposed section 13 of the end 3 of the conveyor belt 1 is positioned adjacent to the facing top cover layer 6 in the region of the end 2 of the conveyor belt 1.

Figure 3:
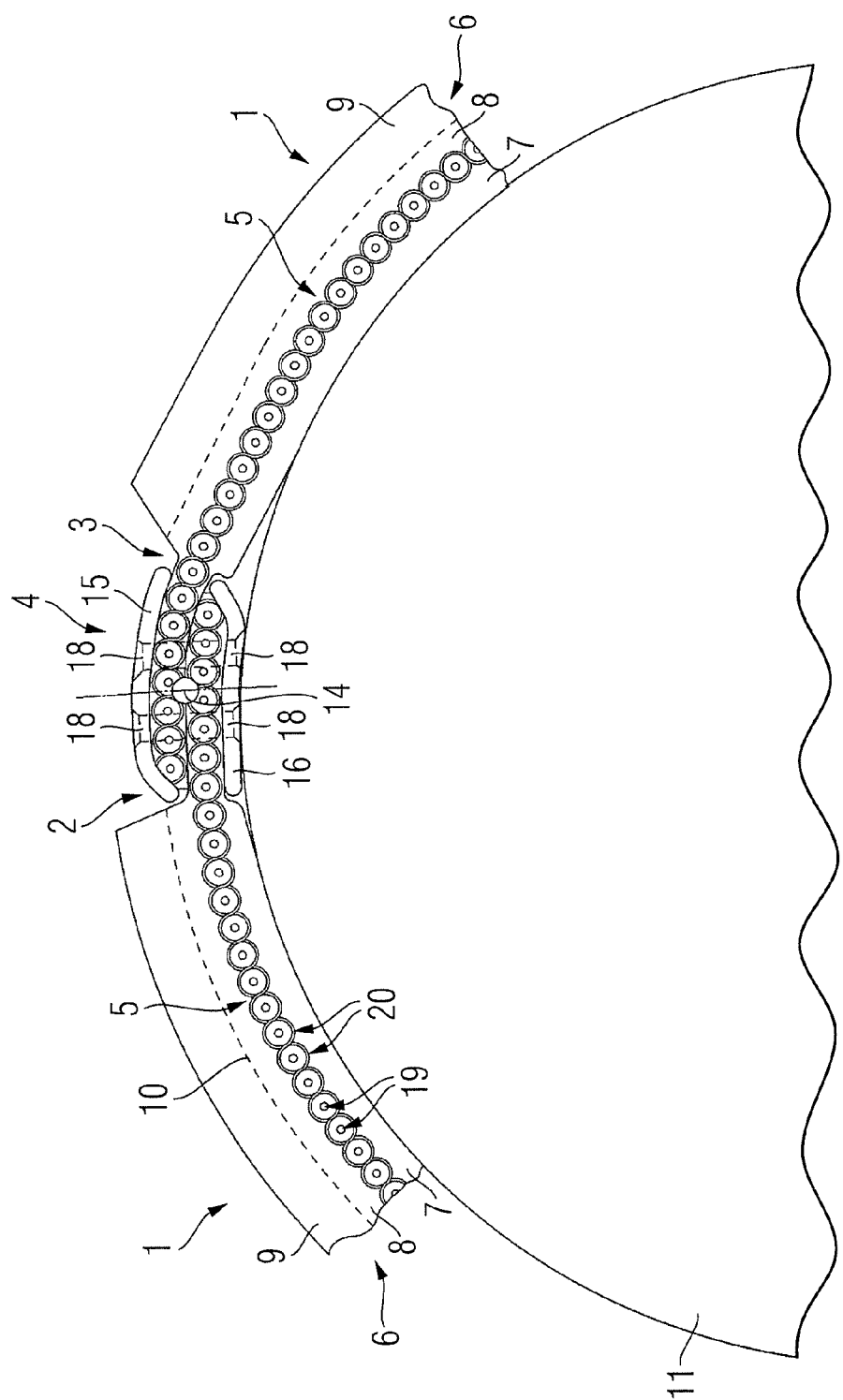
FIG. 3 shows the arrangement of the conveyor belt, provided with the connection shown in FIGS. 1 and 2, and a deflection pulley against which the conveyor belt bears.

In addition, in the example shown in FIGS. 1 and 3, a metal rod or metal cable 14 extending essentially over the entire width of the conveyor belt 1 is inserted between the two sections 12 and 13, and effects additional positive locking between the sections 12 and 13.

The two sections 12 and 13 are pressed between top plates 15 and bottom plates 16 which are of identical design. As can be seen from the illustration in FIG. 2, there are two plates 15 disposed on the top cover layer 6, and arranged one behind the other in the width extent and extend generally over the entire width of the conveyor belt 1. Each plate 15 is subdivided into three sections 17, between which the wall thickness of the plate 15 is slightly reduced in order to reduce its flexural rigidity at these points, and thereby define respective predetermined hinges or breaking points therealong when using crowned deflection pulleys, or if the material to be conveyed should get lodged between the conveyor belt and the deflection pulley. Each illustrated plate section 17 is provided with six holes. The bottom plates 16 are designed in accordance with and similar to the top plates 15. Rivets 18, which pass through both sections 12 and 13 of the fabric ply 5, are driven through the holes in the plate sections of connection plates 15 and 16, which are in each case in alignment with one another. On account of the use of the rivets 18, a relatively thin connection profile in the region of the overlapping sections 12 and 13 can be produced, with due allowance for the thickness of the plates 15 and 16. The plates 15 and 16 press the sections 12 and 13 onto one another, and the rod 14 between the sections 12 and 13 is also pressed. In order to minimize a material displacement in the fabric ply 5 of the weft yarns 19 (which run transversely to the running direction of the conveyor belt 1), in the direction of the warp yarns 20 (which run in the running direction of the conveyor belt 1), the respective plate 15 or 16 can be provided with beads on both sides of the rod 14 in order to form prominences which extend in the direction of the rod 14.

With reference to FIG. 1, the connection plates 15 and 16 have an essentially planar design, with a longer, planar region 21, and an adjoining, substantially shorter, curved region 22. This curved region 22 extends behind the free end of the respective section 12 or 13, and thus ensures that the free end of the section 12 or 13 is pressed against the respective other section 13 or 12. Also, especially good noise characteristics are obtained because of this curved region 22 when the connection 4 on conveyor belt 1 passes over the deflection pulley 11. Due to the configuration of the connection 4 according to the invention, the connection 4 has virtually a double joint defined by joint regions 23 and 24 (FIG. 1).

In one example of the present invention, the conveyor belt 1 has in particular a width of 150 to 300 mm, and a thickness of 6 to 12 mm. The respective ends 2, 3 of the conveyor belt 1 are exposed over a length of 10 to 30 mm, and preferably 15 to 25 mm.

Figure 4:
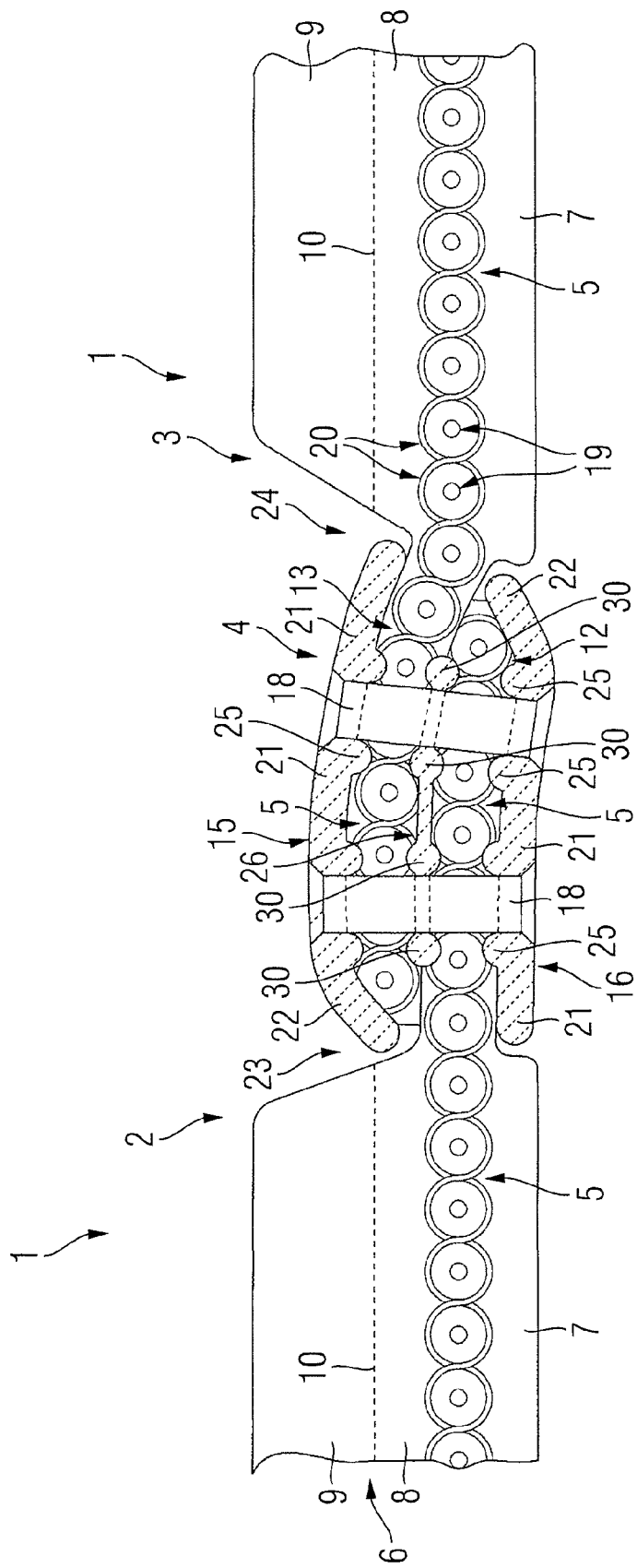
FIG. 4 shows the connection according to the invention between two ends of a conveyor belt, sectioned perpendicularly to the conveying plane of the conveyor belt, illustrated for a second exemplary embodiment.

The following description relates to the second exemplary embodiment shown in FIGS. 4 to 6. Parts corresponding to the first exemplary embodiment (FIGS. 1-3) are designated by the same reference numerals in FIGS. 4 to 6. The plan view of the connection 4 according to the second exemplary embodiment corresponds to that according to the illustration in FIG. 2 for the first exemplary embodiment, and therefore reference is additionally made to FIG. 2 in this respect.

Figure 2:
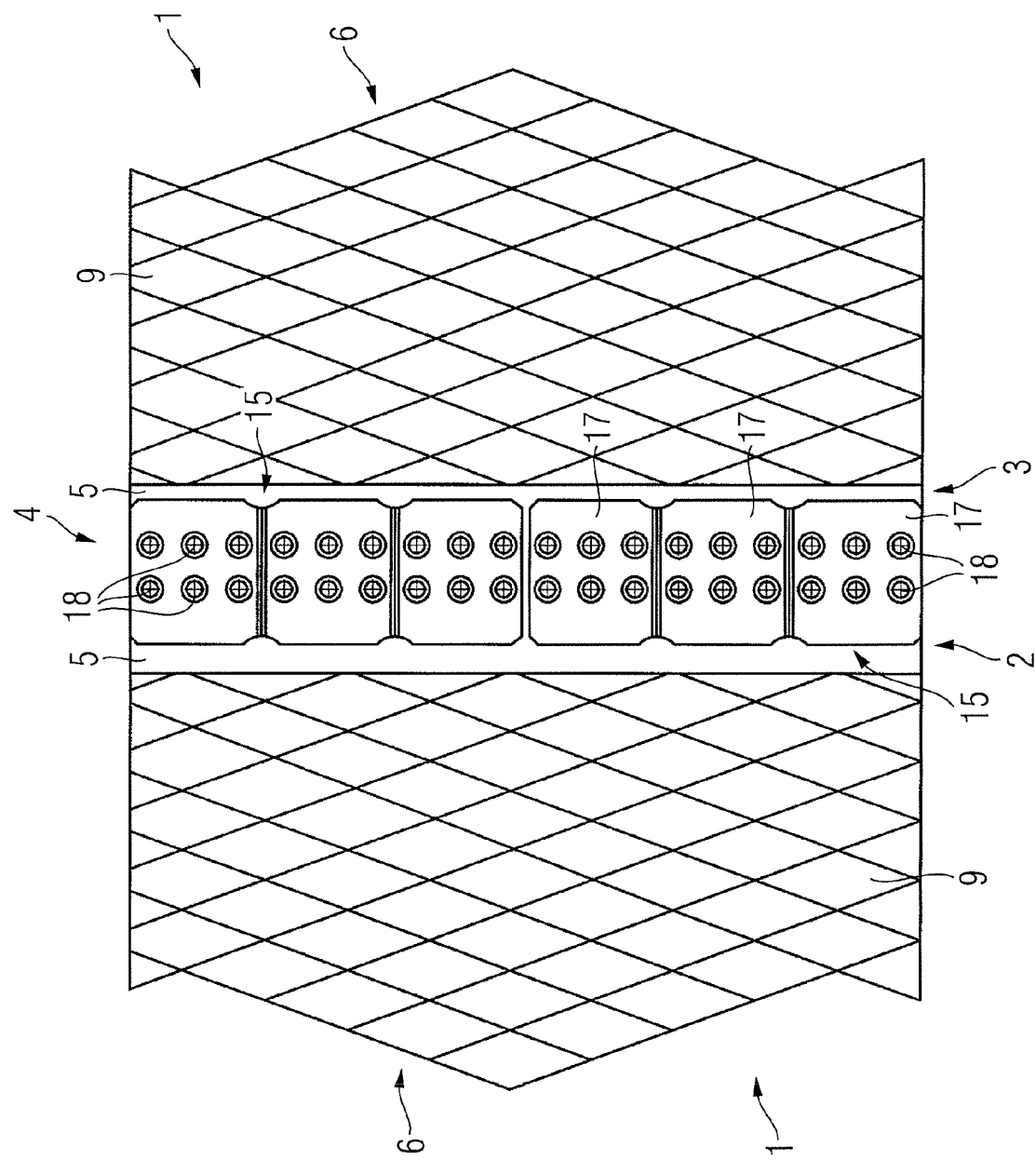
FIG. 2 shows a plan view of the connection shown in FIG. 1 according to arrow II in FIG. 1.

The second exemplary embodiment shown in FIGS. 4 to 6 differs from that according to the first exemplary embodiment according to FIGS. 1 to 3 in that the respective plates 15 and 16 are provided with various beads 25 on the sides facing the fabric ply 5, and run transversely to the pulling direction of the conveyor belt, and which thus form prominences. The beads 25 minimize material displacement in the fabric ply 5, between the weft yarns 19, which run transversely to the running direction of the conveyor belt 1, and the warp yarns 20, which run in the longitudinal direction of the conveyor belt 1.

Furthermore, the second exemplary embodiment (FIGS. 4-6) differs from the first exemplary embodiment (FIGS. 1-3) in that, instead of using rod 14, two intermediate plates 26 are inserted between the exposed ends 2, 3 of the conveyor belt 1. The intermediate plates 26 are oriented in the width direction, and are arranged one behind the other. Each of the two intermediate plates 26 has three plate sections 27, with the outer plate sections 27 being connected to the central plate sections 27 by means of narrowed connecting webs 28, which function to provide predetermined hinges or breaking points. The two intermediate plates 26, arranged one behind the other, extend generally over the entire width of the conveyor belt 1. The respective intermediate plate 26 is preferably made of metal.

The plate sections 27 are provided with six regularly arranged holes 29. The intermediate plates 26 are positioned between the exposed sections 12 and 13 of the fabric ply 5, with identical plates 15 and 16 arranged in an opposing relationship, which are put onto the fabric ply 5 from outside faces thereof. The rivets 18 are then driven through the holes in the connection plates 15 and 16, and through the holes 29 in the intermediate plates 26, so as to form the connection 4 shown in FIG. 4, between the two ends 2 and 3 of the conveyor belt 1. In the exemplary embodiment shown in FIGS. 5 and 6, there are four thickened portions 30 per plate section 27, which extend in the width direction of the conveyor belt and are arranged on both sides of the respective plate section 27 adjacent to the holes 29. The thickened portions 30 produce the same effect as the beads 25. The riveted connections press together the connection plates 15 and 16, and the connection plates 15 and 16 press together the exposed sections 12 and 13 of the fabric ply 5 and the intermediate plates 26 arranged between the sections 12 and 13.

The rivets 18 pass closely through the holes 29 in the plate sections 27, essentially free of play. The rivets 18 are not illustrated in FIG. 6.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. A conveyor belt with opposite ends thereof interconnected by a connection assembly, comprising:
    first and second connection plates extending generally over the entire width of said conveyor belt, positioned on top and bottom sides of said conveyor belt, and having oppositely oriented leading and trailing regions with respect to the running direction of said conveyor belt;
    fasteners extending through said first and second connection plates and said opposite ends of said conveyor belt; and wherein
    said conveyor belt has a mono-ply construction including a flexible central fabric ply, a top cover layer and a bottom cover layer, with said top and bottom cover layers being completely removed from said conveyor belt at said opposite ends thereof to define recesses in which said first and second connection plates are received, and exposed fabric ply regions which are arranged in a mutually overlapping relationship, and permit said conveyor belt to readily flex at both said leading and said trailing regions of said first and second connection plates to reduce wear and noise as said conveyor belt passes over pulleys.

2. A conveyor belt as set forth in claim 1, wherein:
    said top and bottom cover layers are made from rubber.

3. A conveyor belt as set forth in claim 1, wherein:
    said top cover layer has a thickness that is greater thin the thickness of said bottom cover layer.

4. A conveyor belt as set forth in claim 3, wherein:
    said top cover layer has profiling on that side thereof facing away from said fabric ply.

5. A conveyor belt as set forth in claim 4, wherein:
    said profiling is diamond-shaped.

6. A conveyor belt as set forth in claim 1, wherein:
    said exposed fabric ply regions of said conveyor belt overlap completely in such a way that the ends of said exposed fabric ply regions of said conveyor belt are arranged adjacent to said respective top and bottom cover layers of said conveyor belt.

7. A conveyor belt as set forth in claim 1, wherein:
    said connection plates are connected to one another by rivets, screws, staples or fasteners.

8. A conveyor belt as set forth in claim 1, wherein:
    said first and second connection plates are made of metal.

9. A conveyor belt as set forth in claim 1, wherein:
    said connection plates have a generally planar configuration.

10. A conveyor belt as set forth in claim 1, wherein:
    at least one of said leading and trailing regions of said connection plates has a curved cross-sectional shape.

11. A conveyor belt as set forth in claim 1, wherein:
    said connection plates completely cover said exposed fabric ply regions of said conveyor belt with respect to the longitudinal extent of said conveyor belt.

12. A conveyor belt as set forth in claim 1, wherein:
    each of said connection plates includes a plurality of plates arranged next to one another on each side of said conveyor belt.

13. A conveyor belt as set forth in claim 1, wherein:
    each of said connection plates has a thickness corresponding at most to the thickness of the adjacent one of said top and bottom cover layers, such that said connection plates are fully recessed into said conveyor belt.

14. A conveyor belt as set forth in claim 1, including:
at least one intermediate plate which is arranged in the width direction of said conveyor belt between said exposed fabric ply regions of said conveyor belt.

15. A conveyor belt as set forth in claim 14, wherein:
said intermediate plate has holes through which a plurality of said fasteners pass for fastening said intermediate plate to said conveyor belt.

16. A conveyor belt as set forth in claim 15, wherein:
said fasteners pass closely through said holes in said intermediate plate essentially free of play.

17. A conveyor belt as set forth in claim 14, wherein:
said intermediate plate and/or said connection plates have profiled portions oriented toward said exposed fabric ply regions.

18. A conveyor belt as set forth in claim 1, wherein:
said conveyor belt has a width in the range of 150 to 300 mm and/or a thickness in the range of 6 to 12 mm.

19. A conveyor belt as set forth in claim 1, wherein:
said opposite ends of said conveyor belt are exposed over a distance of 15 to 25 mm.

20. A conveyor belt as set forth in claim 1, wherein:
said opposite ends of said conveyor belt which are arranged in an overlapping manner are adhesively bonded to one another.

21. A conveyor belt with opposite ends thereof interconnected by a connection assembly, comprising:
first and second connection plates extending generally over the entire width of said conveyor belt, positioned on top and bottom sides of said conveyor belt, and having oppositely oriented leading and trailing ends with respect to the running direction of said conveyor belt;
fasteners extending through said first and second connection plates and said opposite ends of said conveyor belt; and wherein
said conveyor belt has a mono-ply construction including a flexible central fabric ply, a top cover layer and a bottom cover layer, with said top and bottom cover layers being completely removed from said conveyor belt at said opposite ends thereof to define recesses in which said first and second connection plates are received, and exposed fabric ply regions which are arranged in a mutually overlapping relationship, and permit said conveyor belt to readily flex at both said leading and trailing ends of said first and second connection plates;
said connection plates have a generally planar configuration, and said leading and trailing ends being curved and protruding inwardly toward a center portion of said conveyor belt to reduce wear and noise as said conveyor belt passes over pulleys.

22. A conveyor belt with opposite ends thereof interconnected by a connection assembly, comprising:
first and second connection plates extending generally over the entire width of said conveyor belt, positioned on top and bottom sides of said conveyor belt, and having oppositely oriented leading and trailing regions with respect to the running direction of said conveyor belt;
fasteners extending through said first and second connection plates and said opposite ends of said conveyor belt; and wherein
said conveyor belt has a mono-ply construction including a flexible central fabric ply, a top cover layer and a bottom cover layer, with said top and bottom cover layers being completely removed from said conveyor belt at said opposite ends thereof to define recesses in which said first and second connection plates are received, and exposed fabric ply regions which are arranged in a mutually overlapping relationship, and permit said conveyor belt to readily flex at both said leading and trailing regions of said first and second connection plates to reduce wear and noise as said conveyor belt passes over pulleys; and including
at least one intermediate plate positioned laterally between said exposed fabric ply regions of said conveyor belt, and having a plurality of fastener apertures through which said fasteners pass.

23. A conveyor belt as set forth in claim 22, wherein:
said fasteners pass closely through said holes in said intermediate plate essentially free of play.

24. A conveyor belt as set forth in claim 22, wherein:
said intermediate plate and/or said connection plates have profiled portions oriented toward said exposed fabric ply regions.

25. A method for making a conveyor belt, comprising:
forming a conveyor belt with a mono-ply construction having a flexible central fabric ply, a top cover layer and a bottom cover layer;
removing completely the entire top and bottom cover layers from the opposite ends of the conveyor belt to define recesses therein, and exposed fabric ply regions;
arranging the exposed fabric ply regions on the opposite ends of the conveyor belt in a mutually overlapping relationship;
positioning first and second connection plates having leading and trailing regions with respect to the running direction of the conveyor belt in the recesses on the top and bottom sides of the conveyor belt to extend generally over the entire width thereof; and
inserting fasteners through the first and second connection plates and the opposite ends of the conveyor belt to create a secure connection which permits the conveyor belt to readily flex at both the leading and trailing regions of the first and second connection plates to reduce wear and noise as the conveyor belt passes over pulleys.

\* \* \* \* \*